United States Patent
Epshtein et al.

(10) Patent No.: US 8,433,136 B2
(45) Date of Patent: Apr. 30, 2013

(54) TAGGING VIDEO USING CHARACTER RECOGNITION AND PROPAGATION

(75) Inventors: Boris Epshtein, Bothel, WA (US); Eyal Ofek, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1065 days.

(21) Appl. No.: 12/416,141

(22) Filed: Mar. 31, 2009

(65) Prior Publication Data

US 2010/0246965 A1  Sep. 30, 2010

(51) Int. Cl.
*G06K 9/34* (2006.01)

(52) U.S. Cl.
USPC ............... 382/176; 382/168; 382/331

(58) Field of Classification Search ............ 382/168, 382/170, 171, 176, 177, 229, 231, 266, 305, 382/309, 310
See application file for complete search history.

(56) References Cited

U.S. PATENT DOCUMENTS

| | | | |
|---|---|---|---|
| 7,031,553 B2 * | 4/2006 | Myers et al. ............... 382/289 |
| 7,336,890 B2 | 2/2008 | Lu et al. |
| 2001/0014210 A1 | 8/2001 | Kang |
| 2006/0190445 A1 | 8/2006 | Risberg et al. |
| 2007/0044010 A1 | 2/2007 | Sull et al. |
| 2008/0046925 A1 | 2/2008 | Lee et al. |
| 2008/0106594 A1 | 5/2008 | Thrun |
| 2008/0167102 A1 | 7/2008 | Diakopoulos et al. |
| 2008/0273795 A1 | 11/2008 | Ofek et al. |
| 2008/0313146 A1 | 12/2008 | Wong et al. |
| 2008/0319659 A1 | 12/2008 | Horvitz et al. |
| 2009/0116695 A1 * | 5/2009 | Anchyshkin et al. ......... 382/106 |
| 2010/0246961 A1 * | 9/2010 | Prasad et al. ................. 382/181 |

FOREIGN PATENT DOCUMENTS

WO  2008157628 A1  12/2008

OTHER PUBLICATIONS

Lienhart, et al., "Automatic Text Segmentation and Text Recognition for Video Indexing", retrieved at <<http://citeseerx.ist.psu.edu/viewdoc/download?doi=10.1.1.53.3485&rep=rep1&type=pdf>>, ACM/Springer Multimedia Systems Magazine, 1998, pp. 1-15.

* cited by examiner

*Primary Examiner* — Phuoc Tran
(74) *Attorney, Agent, or Firm* — The Law Office of Michael E. Kondoudis (57) ABSTRACT

In one example, video may be analyzed and divided into segments. Character recognition may be performed on the segments to determine what text appears in the segments. The text may be used to assign tags to the video and/or to the segments. Segments that appear visually similar to each other (e.g., segments that appear to be different views of the same person) may be grouped together, and a tag that is assigned to one segment may be propagated to another segment. The tags may be used to perform various types of tasks with respect to the video. One example of such a task is to perform a search on the video.

20 Claims, 5 Drawing Sheets

TAGGING VIDEO USING CHARACTER RECOGNITION AND PROPAGATION

BACKGROUND

Techniques for searching a body of text documents are well-established. In general, such techniques compare the words in a query with the words in a document. While there are many different algorithms to perform the comparison, the comparison is simplified by the fact that both the query and the text documents are represented in the same medium—i.e., words.

Non-text context, such as video, is normally searched using a text query. In order to perform the search, textual tags are often applied to the non-text content. For example, various sites for sharing still images or videos allow one who posts the content to tag the images or video with names, keywords, categories, etc. Some image-sharing applications allow a user to tag specific regions of an image—e.g., a user might be able to tag a specific region of a photo with the name of the person who appears in that region.

These tagging techniques are dependent on human effort. Thus, in general, the only content that gets tagged is content that interests someone enough to apply a tag, or content with sufficient commercial value to make it worth it to pay for the human labor to tag the content. Image and video sharing sites, and social networking sites, are fairly adept at leveraging people's interest in certain types of content, in order to get people to spend the effort to tag that content. For example, users of social networking sites often tag images or videos that contain pictures of themselves or their friends, because the images are interesting to the person doing the tagging. However, there is a vast body of content that will not get tagged under this paradigm, and is therefore relatively unsearchable. For example, one might want to search video news footage for stories about a certain person or topic. However, most news footage either does not get tagged at all, or gets tagged only with high level concepts. Moreover, if tags are applied at all, the tags are typically applied to the video as a whole, rather than to specific segments of the video Searches on video could be more effective if individual videos could be tagged with detailed information about the content of the videos.

SUMMARY

Tags may be applied to video through analysis of the video, and through recognition of any text that can be captured in the video. In one example, a video is analyzed to divide the video into segments. Each of the segments may be analyzed to determine what text appears in the segments. If text appears in the segment (e.g., a place name, a person name, etc.), that text may be discovered through a character recognition process. A tag may be applied to the segment based on the text recovered from that segment. The tag may identify a person in the segment, a place in the segment, or any other information about the segment.

One way to divide video into segments is through an analysis of the color histograms of the different frames of video. If a video shows a scene for some duration of time, the frames in that scene will have color histograms that are similar to each other. If the histogram changes abruptly from one scene to the next, then, in one example, it may be inferred that the abrupt change marks the boundary between two different scenes. For example, if one scene shows a person talking in a television news studio and another scene shows the skyline of a large city, the frames that are part of these two scenes are likely to have quite different histograms. So, the point in the video where the histogram changes (more than a certain amount) could mark the end the last segment and the beginning of the next segment.

Text may be propagated from one segment to other similar segments. For example, if text captured in one segment indicates that the segment relates to a particular person (e.g., if a name, such as "Dean Smith," appears as text in a video segment), then a tag with that person's name may be applied to the segment. If other segments appear to show the same person, the tag could be propagated to those other segments. In many videos (e.g., television news programs), a person's name may be shown in the first scene in which that person appears, but subsequent scenes may not show the person's name. Thus, propagation may be used to apply tags to a segment in which the significance of the segment cannot be recovered from any text that appears in that segment. In order to determine the segments to which to propagate tags, groups of similar segments could be identified using histogram analysis on the segments.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

A search on text-oriented media such as books, magazines, or Hypertext Markup Language (HTML) web documents is normally performed by comparing the words in a query with the words in the documents. Algorithms that score documents may be complex. However, the mechanical comparison of the query to the document is simplified by the fact that both the query is in the form of text, and much of the relevant information in the document is also in the form of text.

On the other hand, when the medium to be searched is video, still images, audio, or some other non-text-oriented medium, facilitating the search generally involves applying some sort of text-based tags to the content. Normally, these tags are applied by people. For example, videos may be tagged to indicate the general subject of the images or the names of people who appear in the images. Some web sites, such as social networking sites, encourage people to apply finer-grained tags by identifying a specific region of the image, and by identifying the name of a person who appears in that region. These techniques are effective for documents that generate enough human interest, or that are of high enough commercial value, to encourage people to spend the time tagging the content. However, much content lacks sufficient human interest or commercial value to justify the effort, and such content often goes untagged because there is simply not enough human labor available to tag all of the non-text-oriented content that exists. Moreover, for many types of non-text content, the tags are applied at a very coarse level—e.g., a video, as a whole, might be tagged to indicate its general subject and some key people who appear in the video, but one would have to search the video manually to find a specific segment of interest.

The subject matter described herein may be used to automate the process of tagging non-text content, such as videos. Many types of videos contain text that can be read with an optical character recognition (OCR) system, and the content of a given segment of video may be inferred from the text that can be extracted from that segment. For example, a news video might have a text overlay to indicate who is speaking in a particular segment of the video. Therefore, video may be divided into discrete segments, and each segment may be tagged with person names, place names, etc., that are relevant to that segment.

Segmentation of video may be performed through a histogram analysis. For example, color histograms may be calculated for the frames in the video. Successive frames that have similar histograms may be presumed to be part of the same segment. When the histogram changes abruptly from one frame to another, this change may be interpreted as the start of a new segment. If words such as person names, place names, etc., appear in frames of the segment (as determined by an OCR process), the segment may be tagged with the name that is extracted by the OCR process. In many cases, the relevant text appears in one segment of the video but not in subsequent segments. For example, in a news video, the name of the person who appears on screen might be displayed the first time that person appears on screen. If the video moves to another camera shot and then later moves back to a shot of the person, the text showing the person's name might not appear for the second and subsequent times that the same person is shown. Thus, tags may be propagated from one segment to another by grouping together segments that appear to contain the same underlying content. For example, if two people are sitting in a television news studio talking to each other and two cameras are used to film the conversation, there may be two distinct types of camera shots: one of the first person and one of the second person. The video may switch back and forth between shots of the two people. Each time the video switches between the two shots, a new segment begins. However, the different segments showing the same shot of the same person are likely to have similar histograms. Therefore, segments can be grouped together based on histogram similarity. Once the segments are grouped together, it can be inferred that different segments in a group actually show different instances of the same person. Thus, if the person's name was captured in a first one of the segments but does not appear in subsequent segments in the same group, the tag that was assigned in the first one of the segments can be propagated to other segments in that group.

Tags can identify people in a segment, but can also identify other aspects of the segment. For example, if a segment has a text overlay that says, "Chicago, earlier today," the name "Chicago" can be extracted from the segment and can be assigned to the segment as a tag. Moreover, the word Chicago can be identified as a place name, so the segment can be associated with the geographic location of Chicago. In one example, a map could be shown with, for example, a thumbnail of the video in the place on the map that corresponds to the geographic location identified by the tag. E.g., if a segment of video is tagged with "Chicago," then a map of the United States could be shown, with a thumbnail of the video placed over the state of Illinois.

Figure 1:
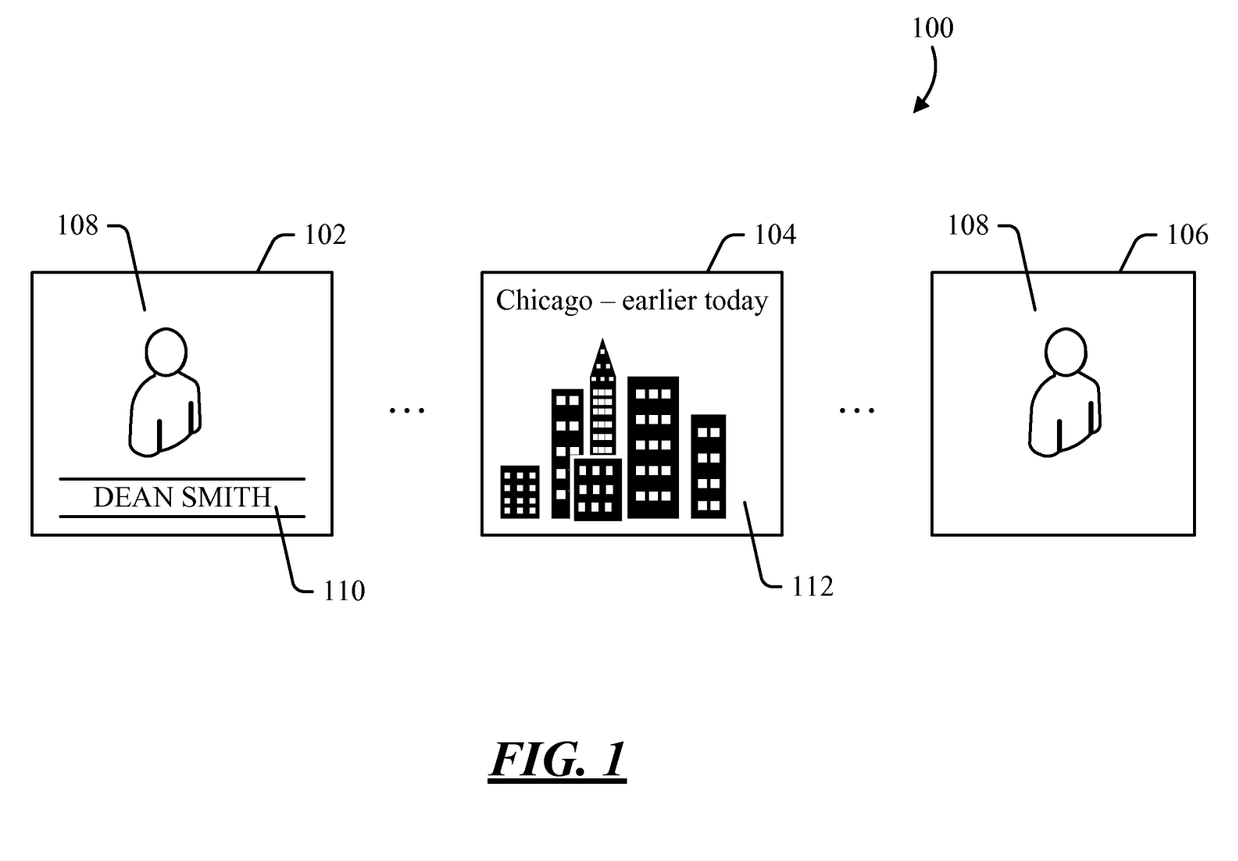
FIG. 1 is a block diagram of different segments of an example video.

Turning now to the drawings, FIG. 1 shows an example of different segments of a video 100. The example of FIG. 1 shows video 100 as containing three segments, although a video could contain any number of segments. Segment 102 shows a person 108 and overlaid text 110 with that person's name. For example, video 100 could be a news program, person 108 might be the anchor of the news program, and the item of text 110 that is overlaid on the image might be the name of the anchor. Segment 102 may contain many frames. For example, segment 102 might be a ten-second sequence of frames in which person 108 is talking about the news events of the day. It is typical in a news program for the name of the anchor to be shown on the screen at the beginning of the program or—in the case of a commercial channel—after commercial breaks. Thus, segment 102 might be near the beginning of video 100, or might appear after a commercial break.

Segment 102 might be shot from a still camera, so the image in each of the frames changes very little from frame to frame—e.g., the frame content may change to reflect motion of person 108's mouth or slight movements of his or her body, but the frames may appear relatively similar to each other. Thus, the frames are likely to have similar color histograms to each other. Video 100 may, initially, be a sequence of frames in which no segmentation is recognized. Thus, a scene segmenter might recognize a group of consecutive frames as being part of the same segment by finding that the histograms of these frames meet some level of similarity with respect to each other.

If the histogram changes abruptly from one frame to the next, then a scene segmenter may infer that a new segment has begun. For example, at some point in the sequence of frames in video 100, one frame shows an image of person 108, and the next frame shows a set of buildings 112. Thus, the first frame that shows a set of buildings 112 instead of person 108 is likely to have quite a different histogram from the previous frame. Thus, a scene segmenter may determine to end the previous segment, and to start the next segment, at that point, thereby marking the boundary between segments 102 and 104.

Segment 104 shows buildings 112, and also contains the words "Chicago—earlier today." Since segments 102 and 104 both contain words, those words may subsequently be read by an OCR process, thereby allowing the words to be represented in the form of textual data. The textual data extracted by the OCR process may be used to label segments 102 and 104 as being associated with a particular person and a particular place, respectively. For example, there may be dictionaries of person names and place names that could be compared with the text extracted by the OCR process. Based on the comparison, it could be determined that segment 102 is associated with a person named "Dean Smith," and that segment 104 is associated with a place named "Chicago."

Segment 106 shows person 108, but without any text overlay. (A scene segmenter may have determined the boundary between segment 104 and segment 106 using histogram analysis as described above.) While segment 106 contains no text for an OCR process to analyze, since segment 106 is similar in appearance to segment 102 (in that both segments show the same person 108 in the same environment and from the same perspective), the frames in segments 102 and 106 are likely to have color histograms that are quite similar to each other. Thus, segments 102 and 106 may be grouped together based on an inference that they show the same scene. Since segment 102 contains text and segment 106 does not contain text, a labeler might determine that whatever text was extracted from segment 102 also applies to segment 106, and thus the tag applied to segment 102 could be propagated to segment 106.

Figure 2:
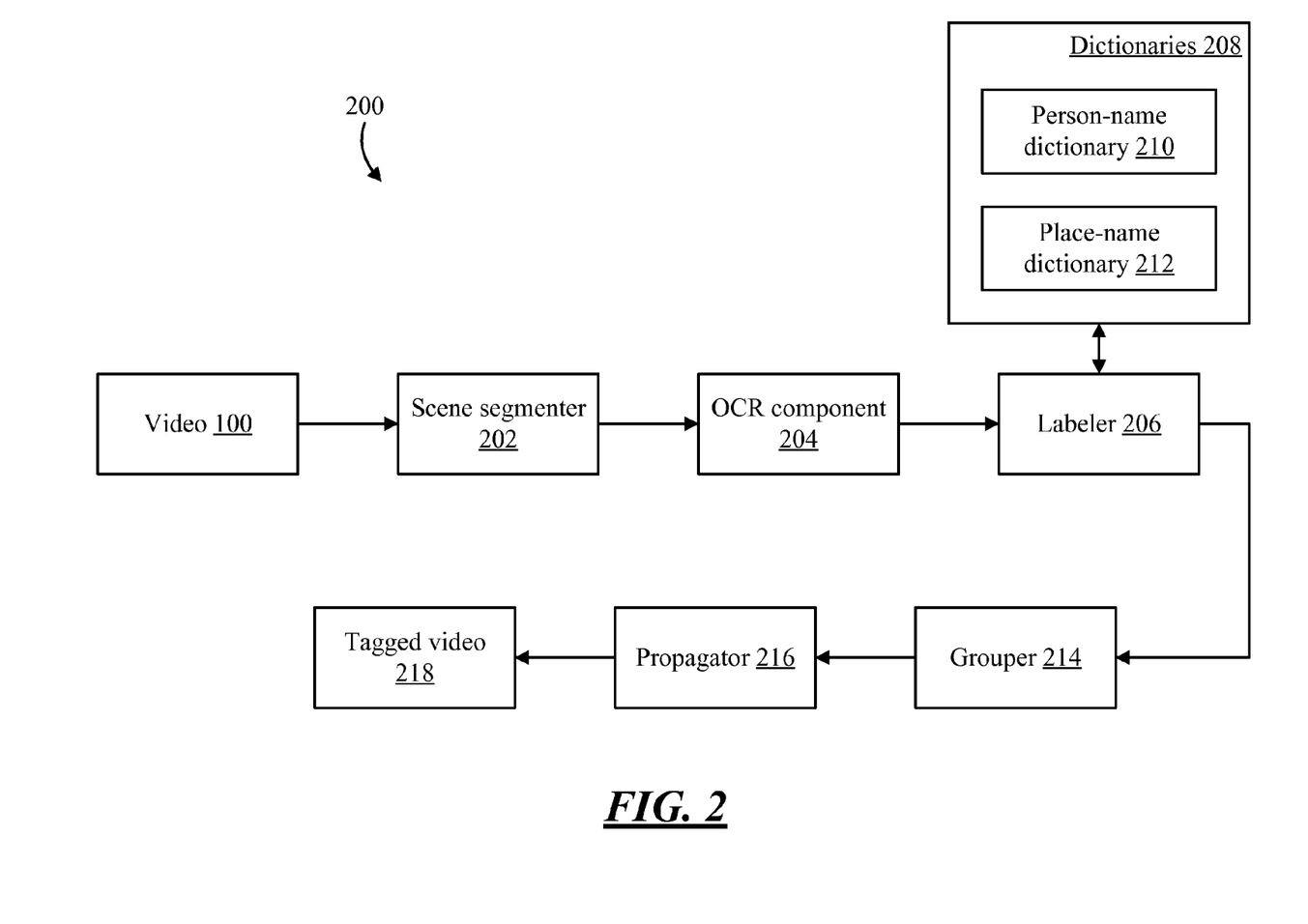
FIG. 2 is a block diagram of an example system that may be used to analyze video.

Analysis of video 100 may identify a set of segments in video 100, and a set of tags that apply to the various segments. FIG. 2 shows an example of a system 200 that may be used to perform this analysis.

System 200 receives video 100 as input. Before turning to a description of the components in system 200, it is noted that FIG. 2 shows system 200 as processing its input in a particular order, as indicated by the lines connecting the blocks. However, the different parts of the analysis performed by system 200, and the flow of information through system 200, could proceed in any order. The order shown is merely an example.

Video 100 may be received by scene segmenter 202. Scene segmenter analyzes video 100 to determine where the various segments in video 100 begin and end. In one example, as described above, scene segmenter 202 may mark the beginning and end of each segment based on observing abrupt transitions in a histogram calculated from the frames. Thus, if a sequence of frames have similar histograms, and then the next frame has a markedly different histogram, then scene segmenter 202 may determine that the transition between these two frames marks the end of the previous segment and the beginning of the next segment. If video 100 shows moving images, then each frame will have a slightly different histogram from its surrounding frames, so scene segmenter 202 may be configured to tolerate some variance in the histogram from frame to frame. However, once the level of difference from frame to frame exceeds some threshold, scene segmenter 202 may conclude that the difference represents the end of one segment and the beginning of the next segment. Various techniques could be used to tune scene segmenter 202 to make appropriate choices about how to break video 100 into segments. For example, scene segmenter 202 could use a set of parameters to determine how to make choices about what level of change between frames constitutes the boundary between segments. A person could provide these parameters to scene segmenter 202, or machine learning techniques could be used to tune the parameters.

OCR component 204 performs character recognition on the frames in the video. OCR component 204 recognizes what geometric structures in a video constitute English letters (or, more generally, symbols in some alphabet) and which ones do not. Thus, OCR component 204 extracts sequences of characters from frames in the video. If text appears in one frame, it is likely that the same text appears in several surrounding frames—e.g., the name of a person who appears in the video might appear on the screen for five seconds worth of video, which, in many video systems, is over a hundred frames. Thus, OCR component 204 may be configured to recognize similarities between frames in order to avoid extracting repetitive information from several frames in a sequence.

In one example, temporal filtering may be used to increase accuracy of the character recognition process. Text tend to be more stable than the video background, so an edge preserving temporal filtering process could be used to blur the moving background video while preserving the overlaid text. This type of filtering may help OCR component 204 recognize text in the images more accurately.

Labeler 206 applies tags to the various segments, based on the text that is extracted from each of the segments. For example, if a name (e.g., "Dean Smith", in the example of FIG. 1) is extracted from a particular segment using OCR analysis, then labeler 206 may apply a label to that segment indicating that the person named "Dean Smith" appears in the segment.

Labeler 206 may be assisted by a set of dictionaries 208. Dictionaries 208 may list various types of names or other words that relate to the types of labels to be applied. For example, if system 200 is attempting to apply tags that identify people and places in various segments, then dictionaries 208 may include a person-name dictionary 210, and a place-name dictionary 212. Person-name dictionary 210 may contain a list of person names, and place-name dictionary 212 may contain lists of the names of geographic locations. Thus, when labeler 206 is attempting to apply tags to segments, labeler 206 may look up text recovered from the images in order to determine that some words appear in person-name dictionary 210 (and are therefore the names of people), and that other words appear in place-name dictionary 212 (and are therefore the names of places). If a word appears in both dictionaries, some disambiguating rule could be used to determine whether the word is (or is part of) a person name or a place name. If the word appears in neither dictionary, then labeler 206 may determine that the word is of no relevance in assigning a tag to the segment in which it appears.

Performing OCR on video images may be an imprecise process, and thus the characters captured from the image may not align exactly with the words in a dictionary. Some amount of tolerance for misspellings, misinterpreted characters, etc., could be used with labeler 206. For example, labeler 206 might compare the captured words with words in dictionaries 208, and, if there is no exact match between the words, labeler 206 might allow words that almost match the words in the dictionaries to serve as the basis of tags. For example, if the captured word does not exactly match any of the words in the dictionary, labeler 206 might find that the captured word is the same as a dictionary word if the captured word and the dictionary word fall within some Levenshtein distance of each other.

Grouper 214 groups segments together based on apparent similarity between the segments. For example, as noted above, one segment may contain the same person or scene as another segment. Plural segments could be determined to contain the same person or scene based on how similar the color histograms of these segments are. Thus, grouper 214 may calculate histograms of the various segments, and may determine that two or more segments belong in the same group based on the histograms of those segments meeting some level of similarity with respect to each other. Comparing histograms is one example way to assess similarity between segments, although similarity could be assessed in any manner.

Propagator 216 propagates tags that have been assigned to one segment to one or more other segments. For example, grouper 214 might determine that three segments (A, B, and C) are in the same group, based on visual similarity across these segments. Segment A might have a text overlay that shows the name of a person or place that appears in the segment. Since text was captured from segment A, labeler 206 may have assigned a tag to segment A based on the captured text. Segments B and C may have no text. However, if grouper 214 has found segments A, B, and C to be visually similar to each other, then propagator 216 may apply, to segments B and C, the same tag (or tags) that labeler 206 has applied to segment A. One example of a rule that propagator 216 may use is to apply a tag in one segment to any other segment grouper 214 has assigned to the same group as that one segment. As another example, propagator 216 might apply a tag in one segment to any other untagged segment in the same group. In the example of the latter rule, a segment would be tagged, in the first instance, based on any text that appears in that segment, but segments that have no text could be assigned tags that are reasonably inferable from visually similar segments that do have text.

An output of system 200 is tagged video 218. Tagged video 218 may contain the original video 100, an indication of the boundaries between segments, and the tags that apply to each segment. For example, tagged video 218 could include the original image data, along with metadata indicating at which frame each segment begins, and additional metadata indicating which tags apply to each segment. The tags and segment boundaries may be used to perform a search on the video, or for the video. For example, if tagged video 218 contains segment 104 (shown in FIG. 1) which relates to the city of Chicago, and if a user is searching a collection of videos for information about Chicago, then tagged video 218 may appear as a hit in that search, and the user could be pointed to the specific segment in that video that has been tagged with the concept "Chicago."

Figure 3:
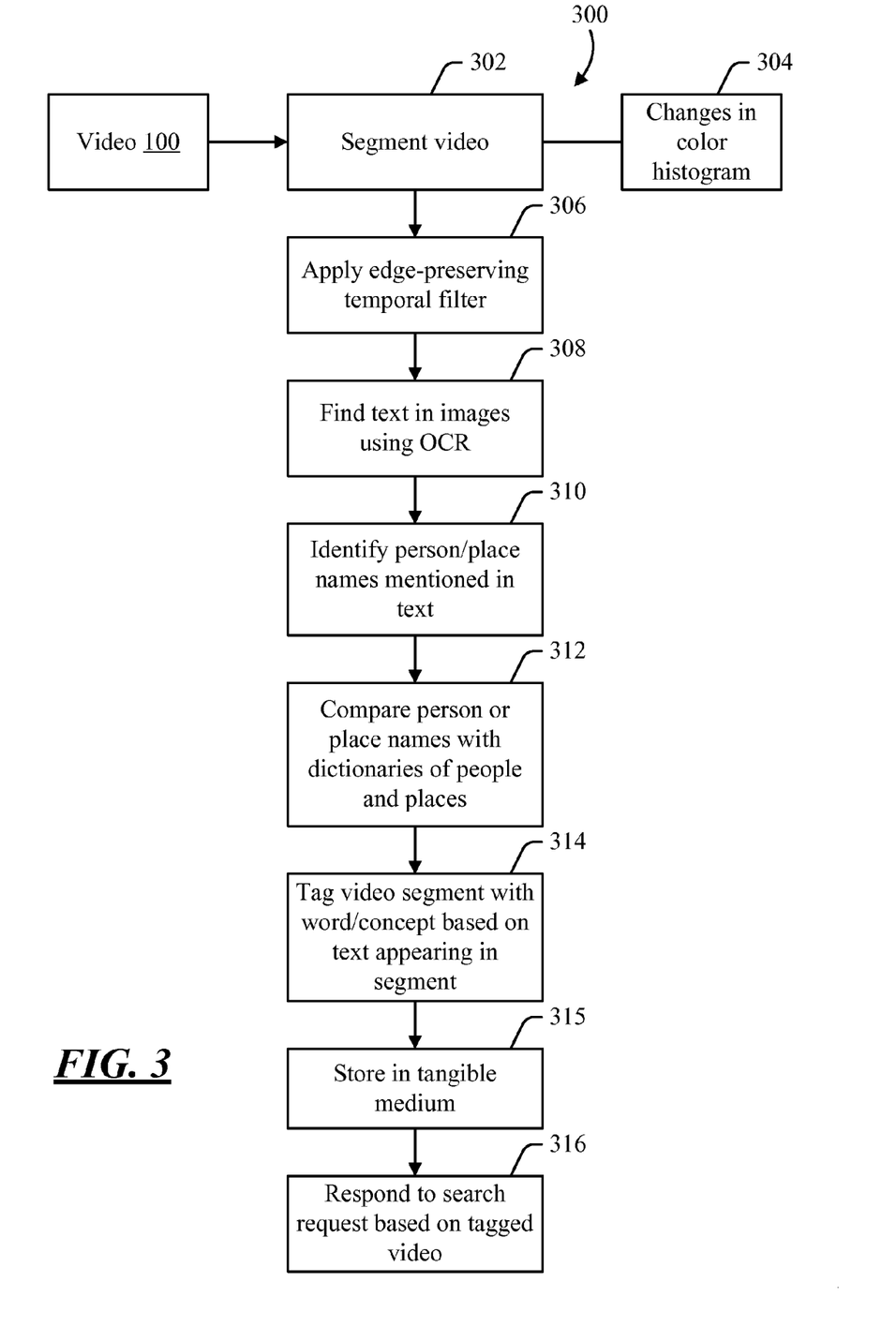
FIG. 3 is a flow diagram of an example process in which video may be tagged.
Figure 4:
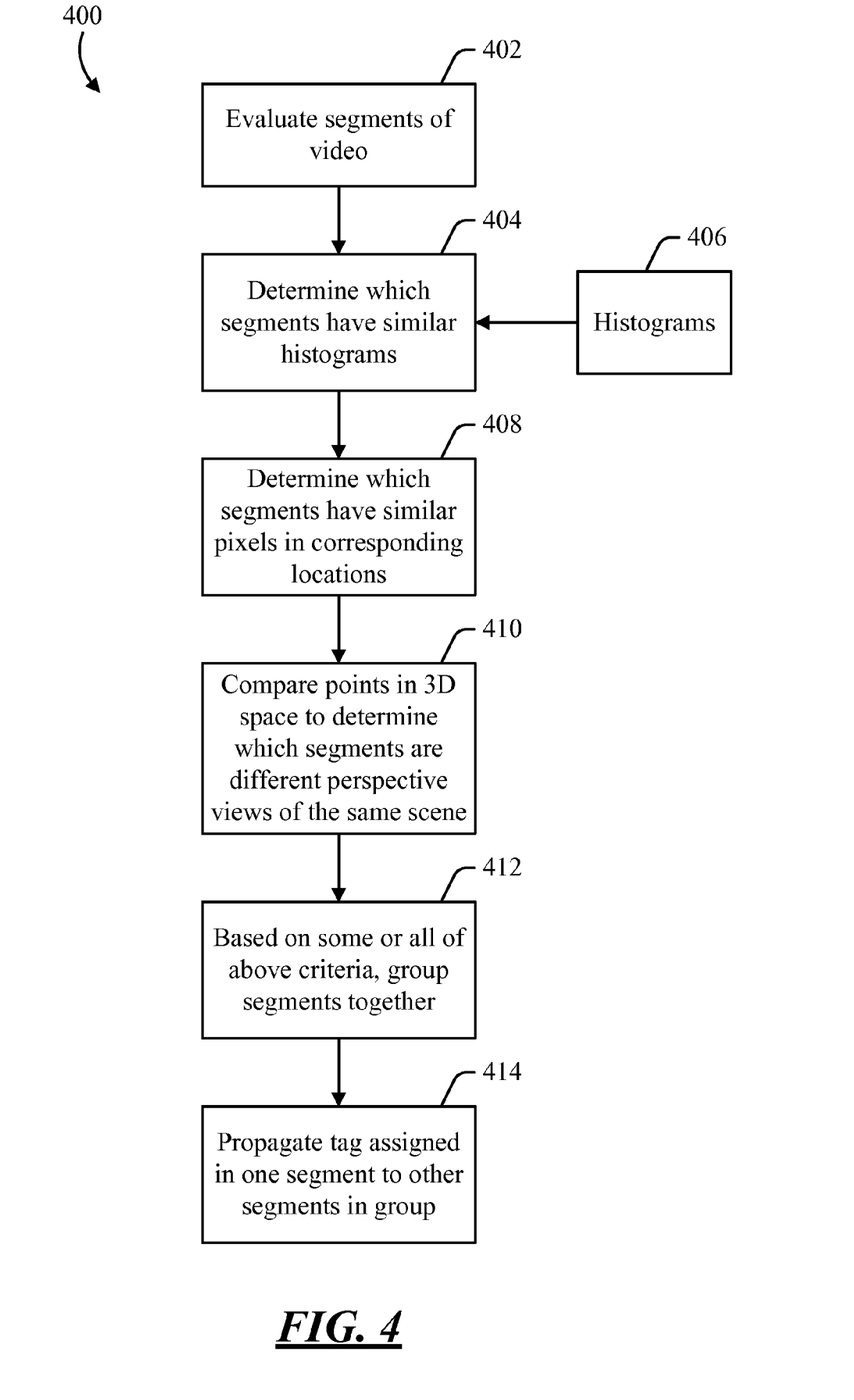
FIG. 4 is a flow diagram of an example process in which tags may be propagated from one segment of a video to another.

FIG. 3 shows an example process 300 in which video may be tagged based on text that is captured in the video. Before turning to a description of FIG. 3, it is noted that the flow diagrams contained herein (both in FIG. 3 and in FIG. 4) are described, by way of example, with reference to components shown in FIGS. 1 and 2, although these processes may be carried out in any system and are not limited to the scenarios shown in FIGS. 1 and 2. Additionally, each of the flow diagrams in FIGS. 3 and 4 shows an example in which stages of a process are carried out in a particular order, as indicated by the lines connecting the blocks, but the various stages shown in these diagrams can be performed in any order, or in any combination or sub-combination.

Process 300 receives video 100 as input. At 302, the video may be segmented. As described above, segmentation may be performed by examining the video, looking for similarity among successive frames, and then declaring a new segment when an abrupt change occurs (e.g., as in the case where an abrupt change in the color histogram occurs, as shown in block 304). This technique is one example way to segment video 100, although any segmentation technique could be used.

At 306, an edge-preserving temporal filter may be applied to the video. For example, an edge-preserving temporal filter may sharpen the edges in characters to be detected by an OCR process, while allowing images such as faces and object to blur. Thus, in one example, an edge-preserving temporal filter may be used prior to the OCR process.

At 308, overlays (or other text) that appears in video 100 may be identified using OCR. Any appropriate OCR system or process may be used.

At 310, words may be identified in the text that was recovered through the OCR system or process. For example, name of people, name of places, dates/times, subjects, etc., may be identified at 310. People names and place names are examples of the type of text that could be identified, although any type of text could be identified. Identification of text may be performed with the aid of dictionaries (at 312). For example, words that are discerned through OCR may be compared with dictionaries to determine the significance of the words. As described above, words detected in an image may be found to be people names by comparing those words with dictionaries of people names. Similarly, detected words may be found to be place names by comparing those words with dictionaries of place names. As also described above, the comparison may insist on an exact match between words in the dictionary and words recovered from an image, or there may be some tolerance for difference between the words. For example, if "Chicago" is a word in a place-name dictionary and the word recovered from an image is "Chrcago" (due, for example, to imprecision in the OCR process), then a comparison process that is configured with some amount of tolerance may recognize the recovered word as "Chicago" even though the words differ from each other by one letter.

At 314, a video segment may be tagged with words and/or concepts based on the text recovered from that segment. Thus, if the name "Dean Smith" appears in a segment, then the segment may be tagged with the name "Dean Smith". Or, as another example, if Dean Smith's name appears in a person-name dictionary, and if that dictionary indicates that Dean Smith is a news anchorman, then the segment could be tagged with a concept such as "anchorman." (The segment could be tagged both with the name and the concept, thereby allowing a search to be performed on the video using the name and/or the concept.) Tags may refer to people, places, dates, time, subject, or any other type of concept. In some cases, the same text may appear across different segments—e.g., the text "Chicago—earlier today" might appear over several different scenes, each of which may be found to be a different segment. Each of the segments could then be tagged based on the same captured text. As noted above, propagation of tags may be used to assign tags to a given segment, even if no text appears in the given segment. An example process of propagation is described below in connection with FIG. 4.

The video and/or its tags may be stored in a tangible medium (at 315). For example, the video and/or its tags may be stored on a disk, tape, semi-conductor memory, or in any other type of medium. Moreover, the tags assigned by the process of FIG. 3 (or by the process of FIG. 4, as described below) may be used in any manner. One example use of the tags is to respond to a search request (at 316). For example, a person might issue a search query with terms like "Chicago", "Smith", or "anchorman". With tags applied to video 100 as described above, a search engine could compare the query with the tags, and could thus determine whether video 100 is responsive to the query (or whether particular segments of video 100 are responsive to the query).

FIG. 4 shows an example process 400 in which tags may be propagated from one segment of a video to another. At 402, segments of a video may be evaluated. At 404, it may be determined which segments in the video have similar histograms. For example, histograms 406 may calculated for the various segments (or for individual frames in those segments), and the histograms may be compared with each other.

At 408, it may be determined which segments have similar pixels in corresponding locations. If two different segments both show the same general scene, then the two segments may have groups of pixels in common. For example, if two segments both show a particular person talking against a fixed background, then both segments would tend to have many of the background pixels in common. The fact that two segments have many pixels in common tends to weigh in favor of a finding that the two segments record the same scene.

At 410, images in segments may be mapped to a three dimensional space, and points in the space may be compared to determine similarities among the segments. For example, two different segments may reflect the same underlying scene, shot from different angles. If two segments are determined to reflect different camera angles, then points in the segments may be mapped to 3-dimensional space, and the points may be compared for commonality and difference. If two segments appear, based on this comparison of points, to show the same scene from different angles, then this fact tends to weigh in favor of grouping the segments together.

(And, conversely, if the comparison shows few points in common in 3-dimensional space, this fact tends to weigh against grouping the scenes together.)

At 412, segments are grouped together based on some or all of the above criteria. For example, if two segments have similar histograms, and/or have many pixels in common, and/or appear (based on a mapping of points in 3-dimensional space) to be images of the same scene taken from different camera angles, then the segments may be grouped together. Otherwise, if these factors indicate sufficient differences between the segments, then the segments may be found not to be in the same group.

At 414, tags are propagated throughout a group. The fact that a plurality of segments are in the same group reflects an assessment (based on, for example, the above-mentioned factors) that the segments appear to record the same people, objects, scene, etc. Thus, if one of the segments has been tagged (e.g., based on an analysis of text that appears in the segment), the tags assigned to that segment may be propagated to other segments in the group. In this way, tags can be applied to one segment based on text contained in another segment based on a visual analysis that shows that the two segments appear to contain similar visual information. As noted above, the same text may appear in different segments. For example, the words "Chicago—earlier today" may be overlaid on several different scenes of Chicago. Thus, one scene might show Grant Park, another scene might show the Chicago River, another might show O'Hare Airport, etc. Since the different scenes would have different histograms, each scene may be marked as a different segment. However, if the same text appears over each segment, then that text could be used to tag all of the different segments on which the text appears. So, the tag assigned to these different segments could be propagated to any segment that appears to be similar to one of the tagged segments. In the above example, a tag based on the "Chicago—earlier today" text could be propagated to any segment that shows Grant Park, the Chicago River, or O'Hare Airport.

Assessing the histogram similarity of segments is one way to propagate tags, although tags could also be propagated in other ways. For example, face recognition technology could be used to determine that the same person appears in plural scenes (and, therefore, that the tag from one scene is to be propagated to another scene). As another example, objects that appear in one scene could be recognized in other scenes, thereby providing yet another basis to propagate a tag from one scene to another. As yet another example, the audio channel of a video could be analyzed to identify segments that appear to be accompanied by similar words on the audio channel. Thus, tags could be propagated from one part of a video to another based on which portions of video appear to have similar audio tracks.

Figure 5:
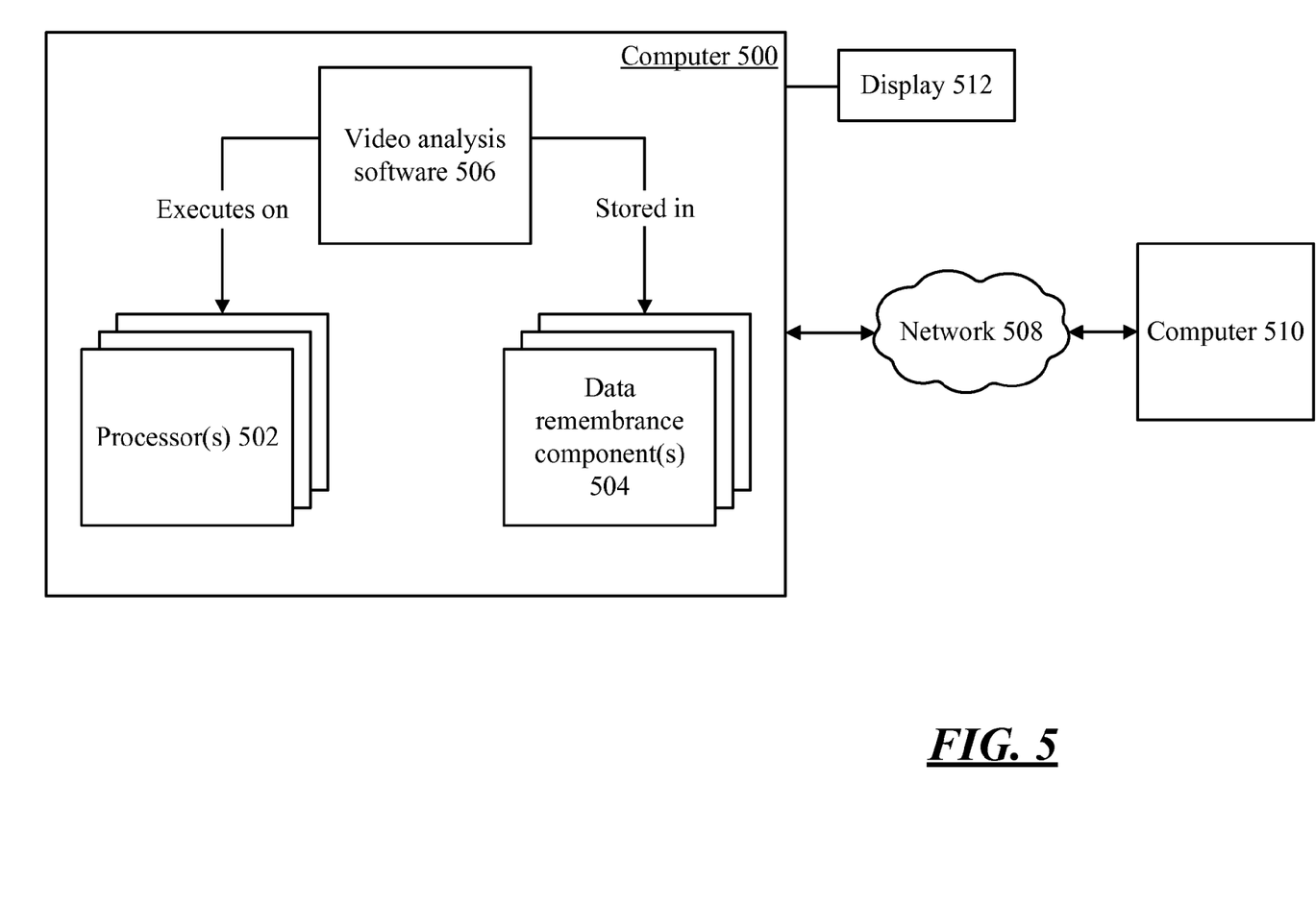
FIG. 5 is a block diagram of example components that may be used in connection with implementations of the subject matter described herein.

FIG. 5 shows an example environment in which aspects of the subject matter described herein may be deployed.

Computer 500 includes one or more processors 502 and one or more data remembrance components 504. Processor(s) 502 are typically microprocessors, such as those found in a personal desktop or laptop computer, a server, a handheld computer, or another kind of computing device. Data remembrance component(s) 504 are components that are capable of storing data for either the short or long term. Examples of data remembrance component(s) 504 include hard disks, removable disks (including optical and magnetic disks), volatile and non-volatile random-access memory (RAM), read-only memory (ROM), flash memory, magnetic tape, etc. Data remembrance component(s) are examples of computer-readable storage media. Computer 500 may comprise, or be associated with, display 512, which may be a cathode ray tube (CRT) monitor, a liquid crystal display (LCD) monitor, or any other type of monitor.

Software may be stored in the data remembrance component(s) 504, and may execute on the one or more processor(s) 502. An example of such software is video analysis software 506, which may implement some or all of the functionality described above in connection with FIGS. 1-4, although any type of software could be used. Software 506 may be implemented, for example, through one or more components, which may be components in a distributed system, separate files, separate functions, separate objects, separate lines of code, etc. A computer (e.g., personal computer, server computer, handheld computer, etc.) in which a program is stored on hard disk, loaded into RAM, and executed on the computer's processor(s) typifies the scenario depicted in FIG. 5, although the subject matter described herein is not limited to this example.

The subject matter described herein can be implemented as software that is stored in one or more of the data remembrance component(s) 504 and that executes on one or more of the processor(s) 502. As another example, the subject matter can be implemented as instructions that are stored on one or more computer-readable storage media. Such instructions, when executed by a computer or other machine, may cause the computer or other machine to perform one or more acts of a method. The instructions to perform the acts could be stored on one medium, or could be spread out across plural media, so that the instructions might appear collectively on the one or more computer-readable storage media, regardless of whether all of the instructions happen to be on the same medium.

Additionally, any acts described herein (whether or not shown in a diagram) may be performed by a processor (e.g., one or more of processors 502) as part of a method. Thus, if the acts A, B, and C are described herein, then a method may be performed that comprises the acts of A, B, and C. Moreover, if the acts of A, B, and C are described herein, then a method may be performed that comprises using a processor to perform the acts of A, B, and C.

In one example environment, computer 500 may be communicatively connected to one or more other devices through network 508. Computer 510, which may be similar in structure to computer 500, is an example of a device that can be connected to computer 500, although other types of devices may also be so connected.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. One or more computer usable, storage media that store executable instructions that, when executed by a computer, cause the computer to perform acts comprising:
receiving a video and dividing said video into segments based on abrupt transitions between successive frames of said video;
using optical character recognition to identify an item of text that appears in a first segment of said video;
applying a tag to said first segment based on said text;
determining which one or more second segments in said video meet one or more similarity criteria with respect to said first segment;

propagating said tag to said one or more second segments based on said second segments meeting said similarity criteria with respect to said first segment; and storing said video with said tag in a tangible medium.

2. The one or more computer usable storage media of claim 1, further comprising analyzing said video.

3. The one or more computer usable storage media of claim 2, wherein said analyzing of said video comprises calculating histograms of frames in said video.

4. The one or more computer usable storage media of claim 1, wherein said acts further comprise:

comparing said text with words in a dictionary; wherein said tag is applied based on said text having been found in said dictionary.

5. The one or more computer usable storage media of claim 1, wherein said acts further comprise:

determining that said text comprises a name of a person based on comparison of said text with words in a dictionary of person names.

6. The one or more computer usable storage media of claim 1, wherein said acts further comprise:

determining that said text comprises a name of a place based on a comparison of said text with a dictionary of place names.

7. The one or more computer usable storage media of claim 6, wherein said acts further comprise:

associating said first segment with a geographic location of said place based on said text having been found, by said optical character recognition, to be in said first segment, and further based on said text having been found to contain said place name.

8. The one or more computer usable storage media of claim 1, further comprising:

determining that said second segments meet said similarity criteria with respect to said first segment based on a comparison of histograms of said first segment and said second segments.

9. The one or more computer usable storage media of claim 1, wherein said acts further comprise:

applying an edge-preserving temporal filter to said video prior to said using of said optical character recognition.

10. A system for labeling video, the system comprising:

a processor;

one or more components that execute on said processor, said one or more components comprising:

a segmenter that receives said video and determines boundaries between one or more segments in said video based on abrupt changes between successive frames of said video;

an optical character recognition component that identifies text that appears in said video;

a labeler that applies a tag, based on said text, to a first one of said segments, said labeler applying said tag to said first one of said segments based on a finding that said text appears in said first one of said segments; and a propagator that propagates said tag to a second one of said segments based on a finding that said second one of said segments meets a level of similarity with respect to said first one of said segments.

11. The system of claim 10, further comprising:

a grouper that groups a set of said segments together based on a finding that said set of said segments meet said level of similarity with respect to each other, wherein said propagator propagates tags in one segment in said set to other segments in said set.

12. The system of claim 10, further comprising:

one or more dictionaries, wherein said labeler looks up said text in said dictionaries and determines which tag to apply to said first one of said segments based on said text appearing in said one or more dictionaries.

13. The system of claim 12, wherein said one or more dictionaries comprise a dictionary of person names, and wherein said labeler determines to tag said first one of said segments as containing a person having a name based on a finding that said text contains said name and that said name appears in said dictionary.

14. The system of claim 10, wherein said segmenter calculates histograms of frames in said video and determines said boundaries based on a finding of which successive frames of said video have sufficiently different histograms from each other.

15. The system of claim 10, wherein said labeler determines that said first one of said segments and said second one of said segments meet said level of similarity with respect to each other based on a comparison of (a) a first histogram calculated from said first one of said segments, or from one or more frames in said first one of said segments, and (b) a second histogram calculated from said second one of said segments, or from one or more frames in said second one of said segments.

16. The system of claim 10, wherein said labeler determines that said first one of said segments and said second one of said segments meet said level of similarity based on a comparison of a first set of pixels that appears in said first one of said segments with a second set of pixels that appear in said second one of said segments.

17. The system of claim 10, wherein said labeler compares points in a three dimensional space from said first one of said segments with points in said three dimensional space from said second one of said segments to determine that said first one of said segments and said second one of said segments are different perspective views of a scene.

18. The system of claim 10, wherein said system uses said tag to respond to a query by indicating, based on a comparison of said query with said tag, that said first one of said segments is relevant to said query.

19. A method of applying tags to video, the method comprising:

using a processor to perform acts comprising:

segmenting the video into a plurality of segments;

using optical character recognition to find text that appears in said video;

comparing said text with a dictionary;

based on a finding that said text appears in said dictionary, and further based on said text appearing in a first one of said segments, applying a tag to said first one of said segments, said tag being based on said text; and responding to a search by comparing a query with tags in said video.

20. The method of claim 19, further comprising:

using a processor to perform acts comprising:

calculating a first histogram based on said first one of said segments and a second histogram based on a second one of said segments, said second one of said segments not containing said text;

determining, based on a comparison of said first histogram with said second histogram, that said second one of said segments meets a level of similarity with respect to said first one of said segments; and propagating said tag to said second one of said segments.

* * * * *